United States Patent
Smith

(10) Patent No.: US 9,931,535 B2
(45) Date of Patent: Apr. 3, 2018

(54) MULTIPURPOSE EXERCISE APPARATUS

(71) Applicant: Marcus Smith, Grayson, GA (US)

(72) Inventor: Marcus Smith, Grayson, GA (US)

(73) Assignee: Marcus Smith, Grayson, GA (US)

( * ) Notice: Subject to any disclaimer, the term of this patent is extended or adjusted under 35 U.S.C. 154(b) by 0 days.

(21) Appl. No.: 15/079,483

(22) Filed: Mar. 24, 2016

(65) Prior Publication Data

US 2016/0279466 A1    Sep. 29, 2016

Related U.S. Application Data

(60) Provisional application No. 62/137,271, filed on Mar. 24, 2015.

(51) Int. Cl.
*A63B 21/00* (2006.01)
*A63B 21/068* (2006.01)
(Continued)

(52) U.S. Cl.
CPC .......... *A63B 22/20* (2013.01); *A63B 21/0004* (2013.01); *A63B 21/068* (2013.01); *A63B 21/4005* (2015.10); *A63B 21/4027* (2015.10); *A63B 23/0405* (2013.01); *B32B 27/00* (2013.01); *A63B 21/0726* (2013.01); *A63B 65/06* (2013.01); *A63B 69/0059* (2013.01); *A63B 2023/0411* (2013.01); *A63B 2210/50* (2013.01); *A63B 2225/09* (2013.01);
(Continued)

(58) Field of Classification Search
CPC .......... A63B 21/0004; A63B 21/00185; A63B 21/065; A63B 21/068; A63B 21/0726; A63B 21/4005; A63B 21/4007; A63B 21/4027; A63B 21/4039; A63B 21/4043; A63B 21/4045; A63B 21/4047; A63B 21/4049; A63B 22/0046; A63B 22/0087; A63B 22/20; A63B 22/201; A63B 22/203; A63B 22/205; A63B 23/035; A63B 23/03516; A63B 23/04; A63B 23/0405; A63B 23/047; A63B 23/0482; A63B 23/0494; A63B 2023/0411; A63B 69/0057; A63B 69/0059; A63B 2208/02; A63B 2208/0204; A63B 2208/0223; A63B 2225/09
USPC ...................... 280/32.6, 79.2, 79.5
See application file for complete search history.

(56) References Cited

U.S. PATENT DOCUMENTS 2,069,384 A * 2/1937 Ogden .................. A63B 22/20
482/132
2,699,953 A * 1/1955 Chaddick .............. B62B 5/0083
193/35 R
(Continued)

*Primary Examiner* — Andrew S Lo
*Assistant Examiner* — Gary D Urbiel Goldner

(57) ABSTRACT

An exercise apparatus is provided. The exercise apparatus includes a housing. The housing includes a substantially planar upper surface, a lower surface and a sidewall disposed about a perimeter of the housing and joining the upper surface and the lower surface together. The present invention may further include a first axle and a second axle secured to the housing and disposed substantially parallel to one another. At least one wheel is rotatably secured to each of the axles and at least a portion of each wheel protrudes beyond the lower surface of the housing. At least a first strap is secured to the housing. A first end of the strap is secured to the housing and a second end of the strap is secured to the housing.

8 Claims, 4 Drawing Sheets

(51) Int. Cl.
*A63B 21/072* (2006.01)
*A63B 22/20* (2006.01)
*A63B 23/04* (2006.01)
*A63B 69/00* (2006.01)
*B32B 27/00* (2006.01)
*A63B 65/06* (2006.01)

(52) U.S. Cl.
CPC ..... *B32B 2307/50* (2013.01); *B32B 2307/744* (2013.01); *B32B 2479/00* (2013.01)

(56) References Cited

U.S. PATENT DOCUMENTS

| | | | | |
|---|---|---|---|---|
| 3,584,871 | A * | 6/1971 | Kelmon, Jr. | A63B 21/0004 482/123 |
| 3,809,393 | A * | 5/1974 | Jones | A63B 22/20 482/132 |
| 4,700,945 | A * | 10/1987 | Rader | A63B 21/055 482/132 |
| 4,792,147 | A * | 12/1988 | Wissing | B25H 5/00 280/32.6 |
| 5,062,630 | A * | 11/1991 | Nelson | A63B 21/0004 280/87.042 |
| 5,201,659 | A * | 4/1993 | Nelson | A63B 21/0004 280/87.042 |
| 5,336,152 | A * | 8/1994 | Winslow | A63B 21/0004 482/132 |
| 5,433,685 | A | 7/1995 | Winslow et al. | |
| 5,669,864 | A | 9/1997 | Brister | |
| D406,684 | S * | 3/1999 | Pool | D34/23 |
| 6,468,187 | B1 * | 10/2002 | Boatwright | A63B 22/20 482/51 |
| 6,607,472 | B2 * | 8/2003 | Toole | A63B 21/0552 482/121 |
| 6,761,672 | B1 | 7/2004 | Williams | |
| 6,773,379 | B1 * | 8/2004 | Bing | A63B 22/20 482/132 |
| 6,845,523 | B2 * | 1/2005 | Copp | A41D 13/0007 2/463 |
| 8,820,755 | B1 * | 9/2014 | Whiteside | B25H 5/00 280/32.6 |
| D742,462 | S * | 11/2015 | Cotto-Colon | D21/662 |
| 9,199,117 | B1 * | 12/2015 | Nicholas | A63B 21/0004 |
| 2001/0018386 | A1 * | 8/2001 | Boatwright | A63B 22/20 482/142 |
| 2002/0065176 | A1 * | 5/2002 | LaFond | A63B 21/068 482/93 |
| 2002/0151416 | A1 * | 10/2002 | List | A63B 21/169 482/121 |
| 2002/0155932 | A1 * | 10/2002 | Ilic | A63B 22/20 482/140 |
| 2007/0197358 | A1 * | 8/2007 | Uguralp | A63B 21/0626 482/132 |
| 2012/0289385 | A1 * | 11/2012 | Marji | A63B 21/065 482/105 |
| 2013/0017938 | A1 * | 1/2013 | Thompson | A63B 23/0222 482/145 |
| 2013/0260970 | A1 * | 10/2013 | Moskowich | A63B 21/068 482/141 |
| 2014/0113773 | A1 * | 4/2014 | Marghella | A63B 1/00 482/38 |
| 2014/0187394 | A1 * | 7/2014 | Blahnik | A63B 21/026 482/141 |
| 2016/0089576 | A1 * | 3/2016 | Rosenstiel | A63B 26/003 482/146 |

* cited by examiner

MULTIPURPOSE EXERCISE APPARATUS

CROSS-REFERENCE TO RELATED APPLICATION

This application claims the benefit of priority of U.S. provisional application No. 62/137,271, filed Mar. 24, 2015, the contents of which are herein incorporated by reference.

BACKGROUND OF THE INVENTION

The present invention relates to exercising and, more particularly, to a multipurpose exercise apparatus.

Physical exercise is any bodily activity that enhances or maintains physical fitness and overall health and wellness. It is performed for various reasons, including strengthening muscles and the cardiovascular system, honing athletic skills, weight loss or maintenance, and merely enjoyment. Frequent and regular physical exercise boosts the immune system and helps prevent heart disease, cardiovascular disease, Type 2 diabetes, and obesity. More people are exercising at home and want to be able to do so in areas of limited space and with little risk of injury.

As can be seen, there is a need for exercise devices that are portable and able to be used within small spaces.

SUMMARY OF THE INVENTION

In one aspect of the present invention, an exercise apparatus comprises: a housing comprising a substantially planar upper surface, a lower surface and a sidewall disposed about the perimeter of the housing and joining the upper surface and the lower surface together; a first axle secured to the housing, wherein at least one wheel is rotatably attached to the first axle and at least a portion of the wheel protrudes beyond the lower surface; a second axle secured to the housing and substantially parallel with the first axle, wherein at least one wheel is rotatably attached to the second axle and at least a portion of the wheel protrudes beyond the lower surface; and at least a first strap comprising a first end secured to the housing and a second end secured to the housing.

In another aspect of the present invention, a method of performing a squat comprises: providing an exercise apparatus comprising: a housing comprising an upper surface, a lower surface and a sidewall disposed about the perimeter of the housing and joining the upper surface and the lower surface together; an axle secured to the housing an comprising at least one wheel, wherein at least a portion of the wheel is protruding beyond the lower surface; securing the exercise apparatus to a back of a user so that the at least one wheel is facing away from the user; pressing the wheel against a wall; and performing the squat so that the wheel is rolling against the wall.

These and other features, aspects and advantages of the present invention will become better understood with reference to the following drawings, description and claims.

DETAILED DESCRIPTION OF THE INVENTION

Figure 1:
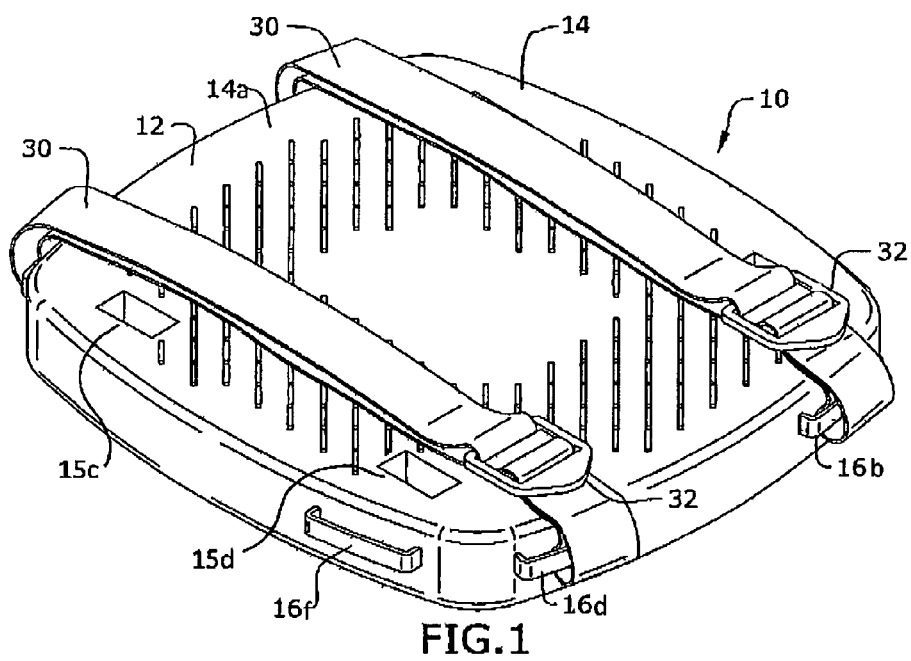
FIG. 1 is a top rear perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a portable fitness device for core and lower body toning and strengthening. The present invention may glide noise free up and down a wall or across any hard surface and on most standard length carpet. The adjustable shoulder straps allow the unit to be worn like a backpack so that the user may lean against a wall to perform squats hands free and in areas of very limited space. While performing squats with the invention the user is able to use their hands to hold dumbbells, medicine balls or other free weights in order to increase resistance.

A natural tendency when doing traditional squats is to lean or slightly lean forward which puts excessive pressure on ones spine and knees which can increase the risk of personal injury. Wearing this device as a backpack and leaning against a wall allows the users to perform squats with perfect posture thus reducing the risk of injury to the back and knees.

Referring to FIGS. 1 through 5, the present invention includes an exercise apparatus 10. The exercise apparatus 10 includes a housing 12. The housing 12 includes a substantially planar upper surface, a lower surface and a sidewall disposed about the perimeter of the housing 12 and joining the upper surface and the lower surface together. The present invention may further include a first axle 26 and a second axle 26 secured to the housing and disposed substantially parallel to one another. At least one wheel 28 is rotatably secured to each of the axles 26 and at least a portion of each wheel 28 protrudes beyond the lower surface of the housing 12. At least a first strap 30 is secured to the housing 12. A first end of the strap 30 and a second end of the strap 30 are secured to the housing 12 forming a loop in between.

Figure 2:
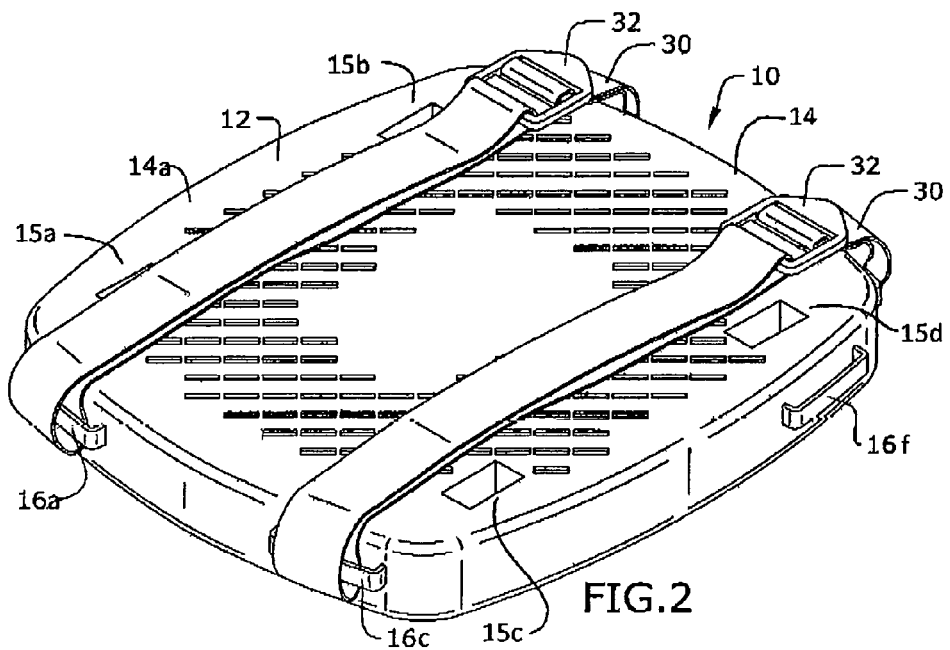
FIG. 2 is a top front perspective view of an embodiment of the present invention.
Figure 3:
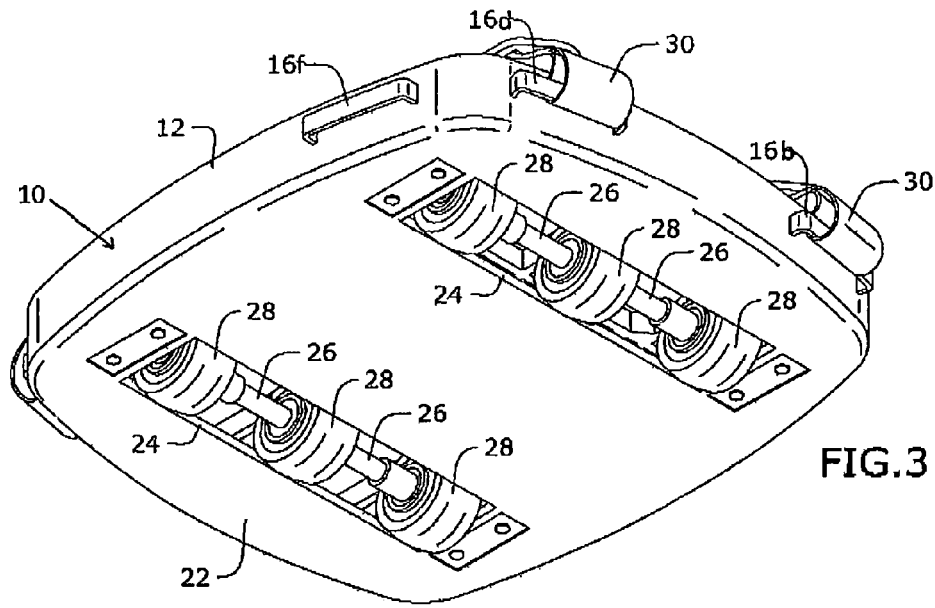
FIG. 3 is a bottom rear perspective view of an embodiment of the present invention.

As illustrated in FIG. 1 and FIG. 2, the strap 30 of the present invention may be secured to the housing 12 by slots 16a and 16b protruding from the sidewall. The sidewall may include a first side, a second side opposite the first side, a front end, and a rear end opposite the front end. The first slot 16a may protrude from the front end and the second slot 16b may protrude from the rear end. In certain embodiments, the present invention may include a second strap 30. In such embodiments, a third slot 16c may protrude from the front end and the fourth slot 16d may protrude from the rear end. As further indicated in FIG. 4 and FIG. 4a, the present invention may include slots 16e on the first side and 16f on the second side protruding from the sidewall to provide the ability to secure a third strap.

Figure 4:
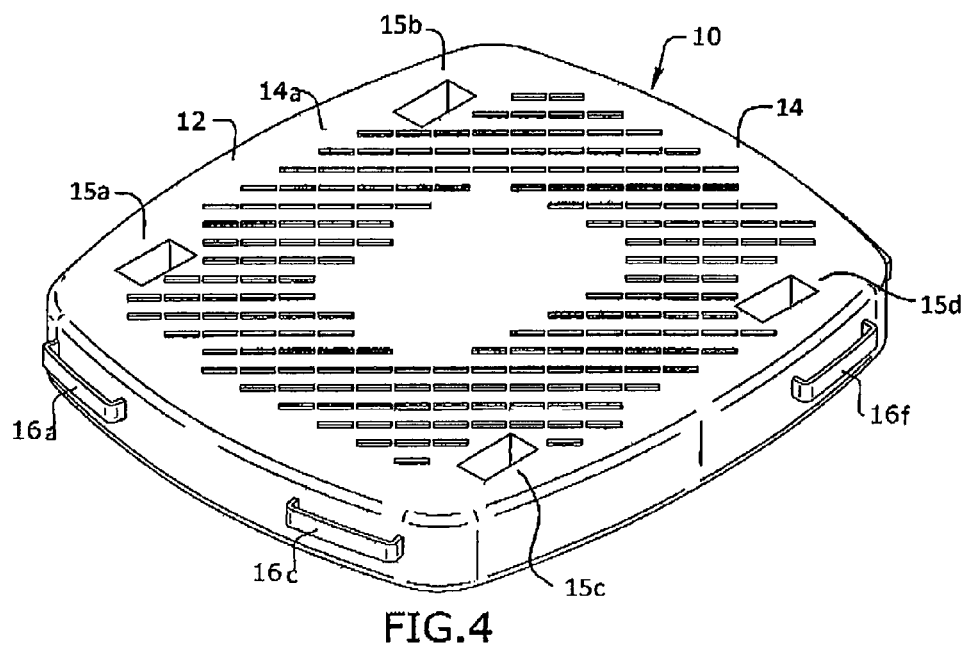
FIG. 4 is a top front perspective view of an embodiment of the present invention shown without strap elements.
Figure 4A:
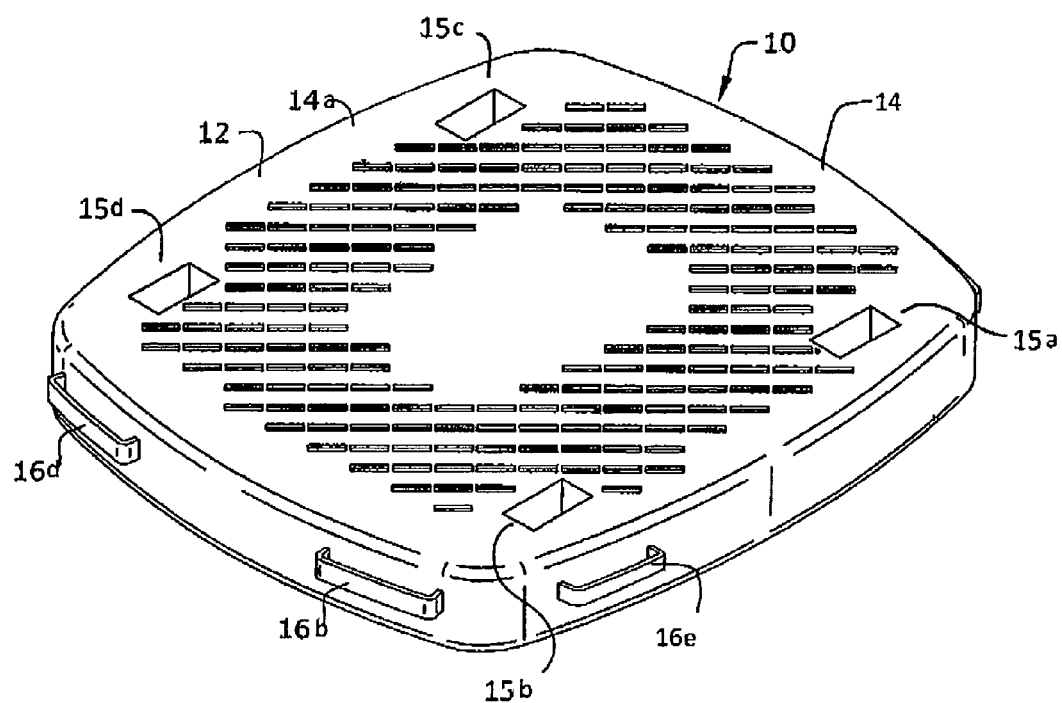
FIG. 4a is a top rear perspective view of an embodiment of the present invention shown without strap elements.

As illustrated on FIG. 4 and FIG. 4a, the upper surface 14 of the housing comprises four rectangular-shaped notches 15a, 15b, 15c, and 15d, respectively positioned substantially adjacent to four corner regions of the upper surface. The first rectangular-shaped notch 15a is substantially aligned with the first slot 16*a* protruding from the front end. The second rectangular-shaped notch 15*b* is substantially aligned with a second slot 16*b* protruding from the rear end. The third rectangular-shaped notch 15*c* is substantially aligned with the third slot 16*c* protruding from the front end. The fourth rectangular-shaped notch 15*d* is substantially aligned with a fourth slot 16*d* protruding from the rear end. The second rectangular-shaped notch 15*b* is also substantially aligned with a fifth slot 16*e* protruding from the first side. In addition, the fourth rectangular-shaped notch 15*d* is substantially aligned with a fifth slot 16*f* protruding from the second side.

As illustrated in FIG. 1 and FIG. 2, the straps 30 of the present invention may be made of a woven fabric material. The straps 30 may be worn around the shoulders of a user to perform additional exercises, such as squats. In certain embodiments, the present invention includes adjustable clips 32. The straps 30 may be wrapped around the adjustable clips 32 so that the straps 30 length may be adjusted. Therefore, different sized users may secure the exercise device 10 about their shoulders.

The wheels 28 of the present invention may be made of a rubber or plastic. In certain embodiments, each of the first axle 26 and the second axle 26 may include two wheels 28. In certain embodiments, each of the first axle 26 and the second axle 26 may include three wheels 28.

Figure 5:
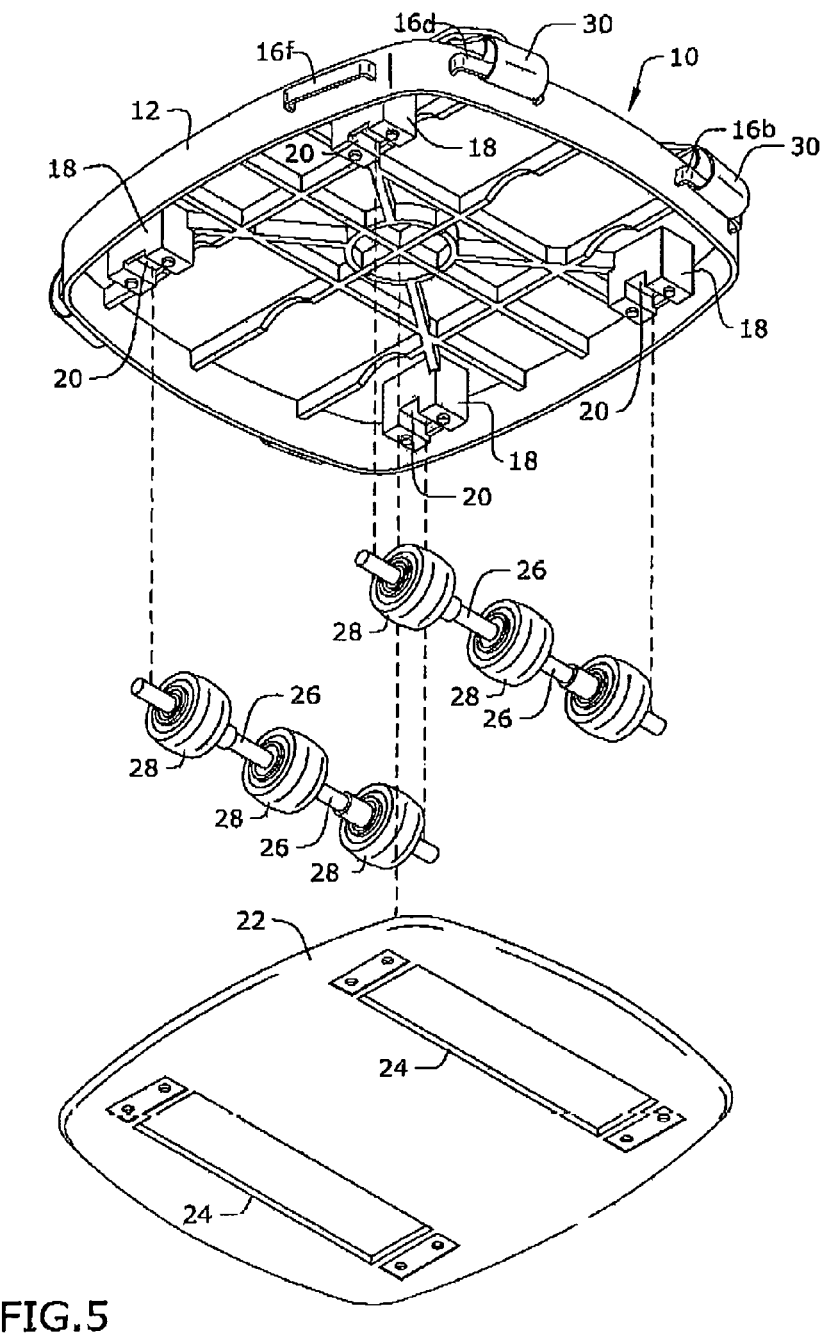
FIG. 5 is a bottom perspective exploded view of an embodiment of the present invention.

As illustrated in FIG. 5, the axles 26 of the present invention may be secured in between the upper surface and the lower surface. In such embodiments, axle standoffs 18 may protrude downward from the upper surface 14 into the housing 12. Each of the axle standoffs 18 may include axle standoff notches 20 such that each axle standoff has an inverted substantially U-shape that protrudes downward from the upper surface into the housing. The ends of the axles 26 may rest within the axle standoff notches 20.

In certain embodiments, the housing 12 may be made of an upper portion having the upper surface 14 and a lower portion having the lower surface 22. As illustrated in FIG. 4 and FIG. 4*a*, the upper surface 14 comprises four rectangular notches 15*a*, 15*b*, 15*c*, and 15*d*. The upper portion may also include an anti-slip grip 14*a* attached to the upper surface 14. The lower portion may be formed by a panel 22 that is separable from the upper surface 14. The panel 22 may include cutout portions 24 to provide clearance for the wheels 28. The panel 22 may be secured to the upper surface 14.

To use the present invention, a user may place the straps 30 of the exercise apparatus 10 around their shoulders like a backpack. The user may then use a small space on a wall to begin doing squats with a perfectly straight back angle or perfect posture which reduces any stress on the spine and or knees. By moving ones feet out farther from the wall reduces knee stress as well. The present invention can also be used on the floor when performing core strengthening exercises.

It should be understood, of course, that the foregoing relates to exemplary embodiments of the invention and that modifications may be made without departing from the spirit and scope of the invention as set forth in the following claims.

What is claimed is:

1. An exercise apparatus comprising:
   a housing comprising an upper surface, a lower surface and a sidewall disposed about a perimeter of the housing and joining the upper surface and the lower surface together;
   wherein the upper surface of the housing comprises four rectangular-shaped notches respectively positioned substantially adjacent to four corner regions of the upper surface; wherein a first and a second of the four rectangular-shaped notches are substantially aligned with a first slot and a second slot of the sidewall; wherein a third and a fourth of the four rectangular-shaped notches are substantially aligned with a third slot and a fourth slot of the sidewall; and wherein the second and fourth of the four rectangular-shaped notches are substantially aligned with a fifth slot and a sixth slot of the sidewall,
   a first axle secured to the housing, wherein at least one wheel is rotatably attached to the first axle and at least a portion of the at least one wheel protrudes beyond the lower surface;
   a second axle secured to the housing and substantially parallel with the first axle, wherein at least one wheel is rotatably attached to the second axle and at least a portion of the at least one wheel protrudes beyond the lower surface; and wherein the first axle and the second axle are secured to the housing in between the upper surface and lower surface, wherein the lower surface comprises cut out portions providing clearance for the wheels;
   a first standoff and a second standoff disposed within the housing, wherein opposing ends of the first axle are secured;
   a third standoff and a fourth standoff disposed within the housing, wherein opposing ends of the second axle are secured;
   an axle standoff notch respectively included in each of the four axle standoffs such that each of the four axle standoffs has an inverted substantially U-shape that protrudes downward from the upper surface into the housing; and
   a first strap comprising a first end secured to the housing and a second end secured to the housing.

2. The exercise apparatus of claim 1, wherein the first end of the first strap is attached to the first slot of the sidewall and the second end of the first strap is attached to the second slot of the sidewall.

3. The exercise apparatus of claim 2, wherein the sidewall comprises a first side, a second side opposite the first side, a front end, and a rear end opposite the front end, wherein the first slot of the sidewall is protruding from the front end and the second slot of the sidewall is protruding from the rear end.

4. The exercise apparatus of claim 3, further comprising a second strap secured to the housing by the third slot of the sidewall protruding from the front end and the fourth slot of the sidewall protruding from the rear end; wherein the fifth slot of the sidewall is protruding from the first side; and wherein the sixth slot of the sidewall is protruding from the second side opposite the first side; whereby the fifth slot of the sidewall and the sixth slot of the sidewall provide an ability to secure a third strap to the housing.

5. The exercise apparatus of claim 1, wherein the first axle and the second axle each comprise two wheels.

6. The exercise apparatus of claim 1, wherein the first axle and the second axle each comprise three wheels.

7. The exercise apparatus of claim 1, further comprising an anti slip grip attached to the upper surface.

8. A method of performing a squat comprising: providing an exercise apparatus comprising: a housing comprising an upper surface, a lower surface and a sidewall, wherein the sidewall is disposed about a perimeter of the housing and joining the upper surface and the lower surface together;

wherein the upper surface of the housing comprises four rectangular-shaped notches respectively positioned substantially adjacent to four corner regions of the upper surface; wherein a first and a second of the four rectangular-shaped notches are substantially aligned with a first slot and a second slot of the sidewall; wherein a third and a fourth of the four rectangular-shaped notches are substantially aligned with a third slot and a fourth slot of the sidewall; and wherein the second and fourth of the four rectangular-shaped notches are substantially aligned with a fifth slot and a sixth slot of the sidewall, the first and second slots of the sidewall enabling attachment of a first strap and the third and fourth slots of the sidewall enabling attachment of a second strap; an axle secured to the housing and comprising at least one wheel, wherein at least a portion of the at least one wheel is protruding beyond the lower surface;

securing the exercise apparatus to a back of a user with the first strap and the second strap attached to respective said slots of the sidewall so that the at least one wheel is facing away from the user when performing the squat with the back of the user facing towards a wall;

pressing the at least one wheel against the wall; and performing the squat so that the at least one wheel is rolling against the wall.

\* \* \* \* \*